Figure 1:
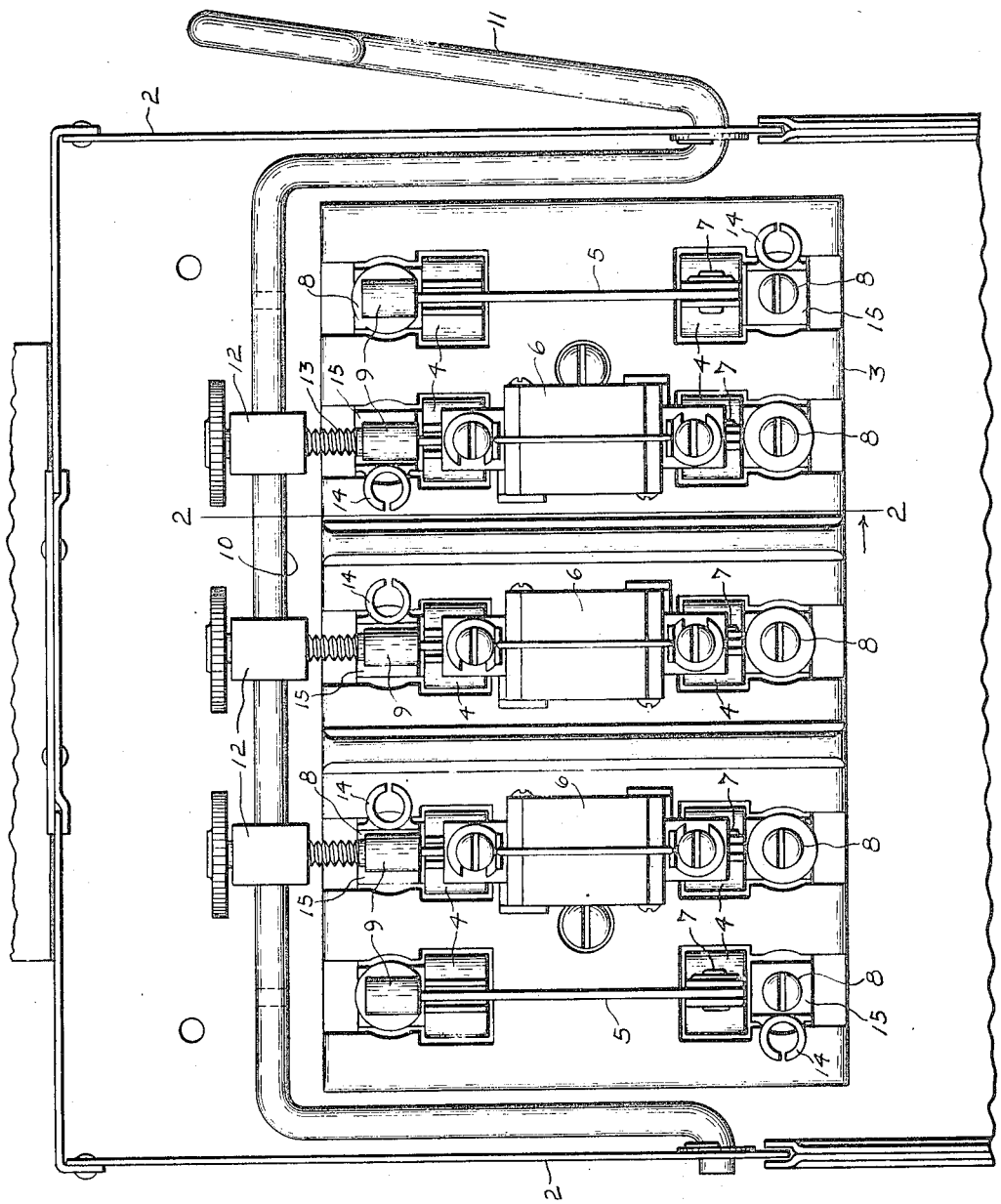

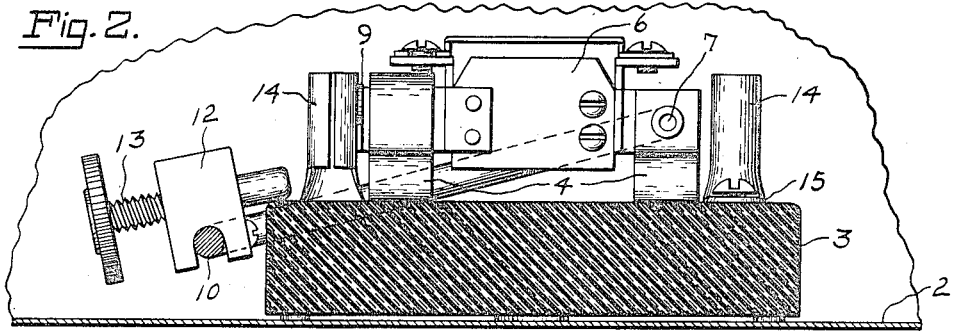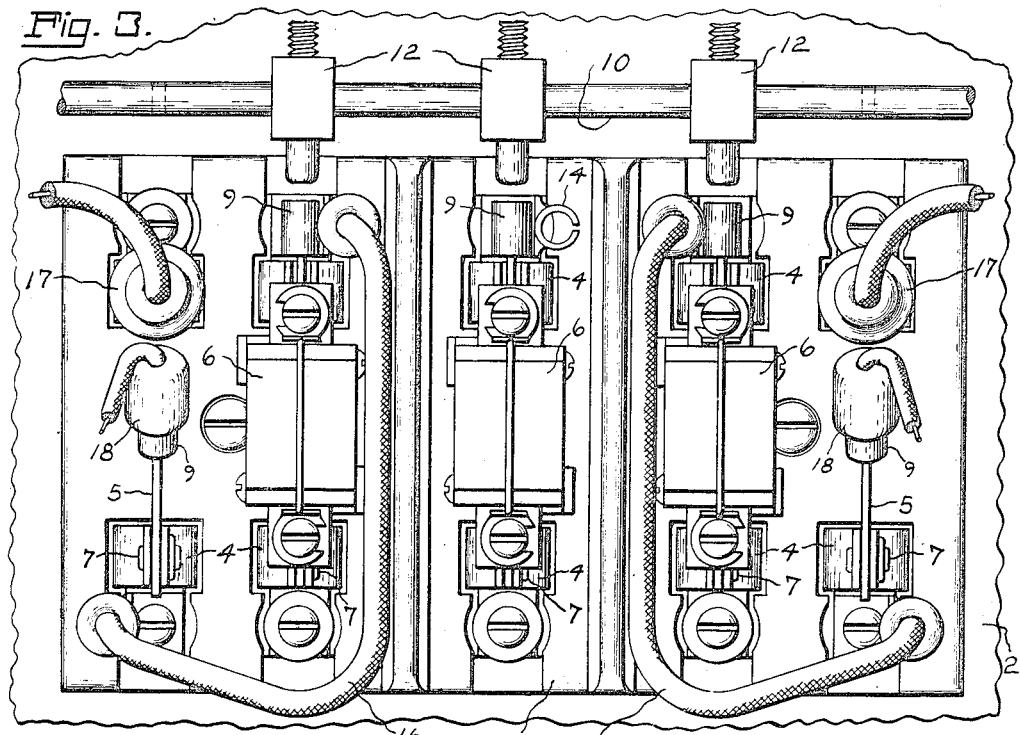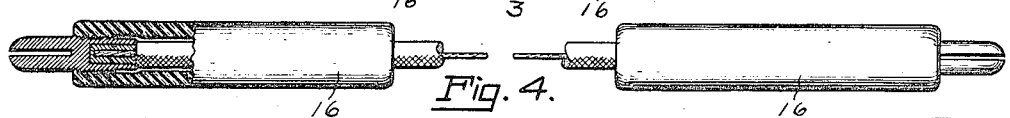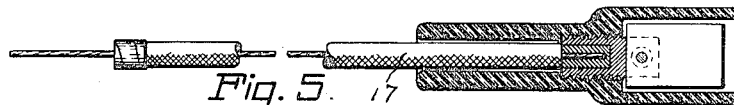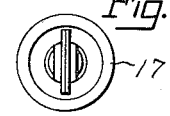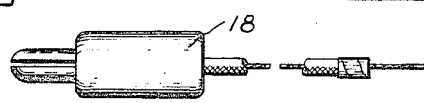

UNITED STATES PATENT OFFICE.

JOSEPH SACHS, OF HARTFORD, CONNECTICUT.

METER-TESTING APPLIANCE.

1,214,078. Specification of Letters Patent. Patented Jan. 30, 1917.

Application filed May 1, 1915. Serial No. 25,157.

*To all whom it may concern:*

Be it known that I, JOSEPH SACHS, a citizen of the United States, residing at Hartford, in the county of Hartford and State of Connecticut, have invented certain new and useful Improvements in Meter-Testing Appliances, of which the following is a specification.

This invention relates to what I shall for convenience term a meter-testing appliance.

The present device possesses the meter testing and switching features of those shown in my Patents Nos. 1,170,112 and 1,170,113 issued to me February 1, 1916, and my contemporaneously pending application Serial No. 24,452, filed April 28, 1915. The present device can be made to operate as a service and meter connection and testing block or can act as a meter testing switch. It involves in its make-up a base provided with contacts arranged in pairs and connectors coöperative with the respective pairs of contacts. I may employ in conjunction with these connectors suitable switch-operating means, to which any one or more of the connectors may be coupled at will, as set forth in my Patent No. 1,170,113. I provide means by which I can by-pass between a service-end connector and a load-end connector without necessarily connecting the by-pass means to either or both the connectors for this purpose, although I prefer to provide means whereby the by-passing can be obtained through the connectors if necessary. That is to say, there is provided in practice a by-pass or jumper which can be connected across from the service to the load side of the meter without being mechanically connected with either of said connectors. The jumper or by-pass while functioning to by-pass from the service to the load side around the meter coil as has been explained in my copending applications already noted, may do so without necessitating current flow through both the service and load end connectors, although it is in some instances desirable that the by-passing current pass through one of the connectors, (the service-end connector) when this service-end connector is a fuse-carrying-connector. The connection across from the service to the load side by the jumper or by-pass is made, instead of by direct mechanical connection with both the service and load end connectors, and thereby including them both in the electrical by-pass path, by connecting one of the jumper or by-pass contacts or terminals to one of the wire connection and contact members of the pair coöperating with the service side or end connector and the other terminal or contact of the jumper or by-pass to one of the wire connection and contact members of the pair coöperating with the connector on the load side or end. In order to obtain the advantages of protection in the by-passed circuit, that is the customers' load, it is desirable that the by-pass be so disposed electrically as to include the connector whether it be the load end or service end connector provided with a fuse. Ordinarily the service-end connector would be the fuse-carrying connector, and consequently the by-pass or jumper would be connected across from the meter-connecting connection and contact member coöperating with the service-end connector to the load-end connection and contact member coöperating with the load side or end connector. When the by-pass is so disposed and connected across, the current passes through the fuse-carrying service-end connector and the by-pass to the load end of the load side or end connector, thus making it possible to open the load-end connector to free one of its coöperating connection and contact members (the meter connected connection and contact member) for testing purposes. When so freed this connection and contact member may receive a coöperative plug or blade testing terminal of a testing circuit and serve in the manner already described in my previous applications. In addition the connector which has been opened up, that is the load end or side connector may if desired receive the potential testing plug or terminal in the manner and for the purpose already described in said prior applications, or if desired this potential testing plug may be connected to the other connector, that is the service end connector, which is in connecting relationship with its respective pair of contacts. If desired instead of the testing appliance, plug or other terminal being received directly into the freed contact of the connection and contact member above described, this testing plug terminal or contact may be received or coöperate with any other part of the connection and contact member.

It will be understood that in a meter testing and service connection appliance whether serving for this purpose alone or also serving and functioning as a service switch, it is desirable as already indicated in my prior patents hereinbefore mentioned, and applying to the same general line of devices, that there should be provided in a meter-testing appliance of the character under consideration, a service-end connector with its coöperative pair of connection and contact members and a load-end connector with its coöperative pair of connection and contact members, and such a pair of service and load connectors should be provided in each leg of the circuit in which a meter-coil is included. Consequently it will be understood that there may be one or more of such pairs of service and load end connectors with their coöperative connection and contact members, this depending entirely upon how many meter coils are to be included in the different wires of the circuit. In addition as has been stated in said prior applications, there may be individual connectors provided serving in wires of the circuit in which there is no meter coil included, as for instance in the case of a neutral in a three-pole circuit or one of the wires of a two-pole circuit in which latter case the meter wire circuit would only have one coil which would be included in one wire only.

Irrespective of how many pairs of load and service end connectors are provided, it will be understood that the service-end or the load-end connector may function in addition to its functioning as a meter testing element, also as a circuit-controlling or switching member associable and connectible together with another connector or connectors in the manner described in my other applications and thus serving as a service switch or a switch. A desirable condition is obtained, however, when the service end connector serves in this dual capacity. There is a switch-operating member which may in some instance be omitted, but which when present, preferably has means for coupling it at will to any one or more of the connectors as set forth in these several prior applications. I also provide means by which the service and load end connectors may be by-passed through mechanical connections directly therewith, and these means on the connectors may receive other testing means, and they may also receive the coupling or connecting parts of the switch operating means.

Referring to the drawings: Figure 1 is a face view of a meter testing appliance involving my invention and showing the parts which are to be protected or incased, the front of the casing being removed and a part of the casing being broken away. This view shows a switch operating member connected with several of the connectors for switching purposes. Fig. 2 is a side elevation partly in section, the section being on the line 2—2 of Fig. 1 and extending through the transverse portion of the switch operating member, only a part of the casing showing and being in section. In this illustration the switch operating member is uncoupled from all the connectors to adapt the appliance for testing. It might also be noted that Fig. 2 is as seen from the left of Fig. 1. Fig. 3 is a face view of the block shown in Figs. 1 and 2, the intermediate portion only of the operating member appearing, and the latter being uncoupled from the several connectors. The view also illustrates certain appliances used in testing and in operative position. Fig. 4 is a plan view partly in section of a by-pass testing element, the intermediate portion being broken away and the terminal portion brought together. Fig. 5 is a sectional view of a main testing plug with its attached flexible wire or cable. Fig. 6 is an end view as seen from the right in Fig. 5. Fig. 7 is a potential testing plug.

Like characters refer to like parts throughout the several figures.

In come cases the appliance may comprise a casing, especially where certain parts are to be protected. In other instances all the parts may be unincased. The casing when present may be of any suitable nature; that shown and denoted in a general way by 2 satisfactorily meets my requirements. I provide a base on which certain of the parts are mounted and the base 3 answers satisfactorily in this respect. This base is generally made of insulating material such as porcelain. It is equipped with contacts of some convenient kind which as usual are arranged in pairs. The contacts shown are denoted by 4 and are of two-lip clip type. Coöperative with each pair of contacts is a connector movable to close or open connection therebetween. As will be obvious, the connectors may be of any desirable nature. In a testing appliance, they will usually but not necessarily, be of two general kinds, one plain or unfused, and the other fused, and in turn when a fused connector is present it may take any one of several forms.

In Figs. 1, 2 and 3 the base therein represented is equipped with five connectors, two of them such as those denoted by 5 being plain and the other three designated by 6 being fused. The connectors 6 carry link fuses. The connectors of whatever nature the same may be are preferably mounted for swinging movement, each connector being pivoted as at 7 to one of its pair of contacts 4 to permit the opposite or rupturing end of said connectors to swing into or out of contact with the coöperating contact of said pair. Electrically associated with each of the contacts 4 is wire connecting means denoted in a general way by 8. The contacts and the respective associated wire connecting means 8 may be attached to the base 3 in any one of several ways familiar in this art. These connectors so far as their testing and switching functioning are concerned serve practically in the same manner as the connectors in the hereinbefore identified patents. In my copending application, Serial No. 24,452, I have shown a novel form of connector. The plain connector 5 herein shown is exactly like that shown in said application. The fused connector 6 differs only from the fused connectors of said application in the character of fuse that is carried thereby. In the present instance the fuse is of link type instead of being of plug construction. The connectors 5 and 6 as will therefore be understood, are provided at their rupturing ends with socket portions 9 intended to receive either testing or switch operating means. As shown the sides of the casing 2 support the pivotal terminal portions of the bail-like body of the switch operating member 10; this body as represented being inclosed by the casing and having an external handle 11 by which it can be operated. The transverse portion of the body of the operating member or element 10 is provided with insulating blocks 12 which in turn carry coupling screws, pins or plugs 13, the exact counterparts of the corresponding parts shown in the last mentioned application. These pins, screws or plugs 13 are movable into and out of appropriate socket portions 9 as may be desired. When a coupling pin 13 is in a socket portion 9, the connector of which said socket portion forms a part, will be opened or closed on the proper movement of the operating member or element 10. In the present case as in the application to which I have last alluded, the blocks or supports 12 are adjustable on the operating member or element 10. As will be obvious I have illustrated and briefly described merely one of many suitable ways of coupling or uncoupling as may be desired, a connector with an operating member or element. The socket portions or equivalent means as 9 associated with the respective connectors are adapted also to receive testing appliances if necessary.

Associated with one or more contacts of the appropriate connectors which may be utilized for testing, are testing device connecting means of any suitable nature. In the embodiment here shown such means are provided by the tubular sockets 14 forming a part of the washers 15 constituting respectively parts of the wire connecting means denoted in a general way by 8. It is desirable that the sockets 14 be of such character as to receive the same testing plugs, pins or other members as are received in or coact with the sockets 9 on the connector members, such for instance as those denoted by 5 and 6. As has been clearly discussed in my last referred to copending application these testing device receiving means whether located like the sockets 9 or the sockets 14 may be of any desirable character so long as these testing device receiving or coacting means are adapted to properly contact and connect with appropriate testing devices and as has just been stated, it is desirable that such testing device receiving means located like those indicated by 9 and 14 be adapted to interchangeably receive the same form and style of testing device, plug, pin or other means. It is also clear from what has been said in my copending prior applications that one of the contacts of the pair coacting with any of the proper connector members may when freed act as a testing device receiving means, the testing device, plug or of whatever form it may be, being adapted to coact with such freed contacts in testing. While I have here shown contact clips of a certain character to coact properly with the blade like connectors, and while it is a fact that as shown the clip like contacts so coacting with the connectors are when thus made not adapted to receive the same testing devices as would coact with or enter into the sockets 9 and 14; it will be clear that if desirable I may provide connector coacting contacts of such form as to be adapted to not only properly coact with the connector but to also be of a form similar to that used in the test device receiving means 9 and 14. When such is the case, it will be obvious that the testing devices, plugs, pins or blades, or of whatever form they may be are then interchangeably coactible or associable not only with the sockets 9 and 14 but also interchangeably usable with the connector coacting contacts themselves when the latter are freed for testing purposes.

In Fig. 1 I have represented a three-wire meter testing switch in which all three wires are opened and closed by the switch. The three link-fuse carrying connectors shown form the circuit controlling switching members in each of the legs of the circuit, these three switching members being coupled together to the switch operating element 10, so that when this is manipulated, said connector circuit controlling members 6 move into and out of coacting contact with their respective rupturing end contacts. In Figs. 2 and 3 I have shown the switch operating member or element 10 disconnected or uncoupled from the connector members and dropped away in order to make the testing device receiving socket on the connector members accessible for testing purposes. The appliance is now in condition for testing and for association therewith of the proper testing plugs, pins, blades or testing devices of any other form that may be necessary for proper coöperation with the coacting parts on the block. It will be understood that the general arrangement of the several connectors is as has already been discussed in the early part of this specification; that is to say there is a service end and a load end connector, in each of the wires in which a meter coil is inserted. Consequently inasmuch as the particular appliance here shown is adapted for use on a three-wire circuit, there is a service end and a load end connector for each of the two outside wires of the circuit while there is also provided a single central or neutral connector. The three fuse carrying connectors shown serve as circuit controlling switching members. The central fuse carrying connector is in the neutral wire. The two fuse carrying connectors on opposite sides of the central connector are each the service end connectors complemental to each of which is one of the two unfused connectors serving as a load side or end connector. While there may be any arrangement appropriate for the particular testing service which the applicance may be called upon to perform, it will be found that the arrangement of the sockets like 14, or other appropriate testing device receiving means, serves very well when these parts 14 are located as shown. That is to say it is desirable to provide such means like 14 at the meter connected end of each of the service side connectors, and a similar part like 14 at the load connected end of the load side connector in the two outside wires. It is also desirable that such means like 14 be provided on the load or rupturing end of the central or neutral connector, but this is only provided for potential tests or connections.

After the block has been prepared by uncoupling the switch operating element 10, the parts thereof are ready to receive the testing devices such as plugs, pins or any other means that may properly coact with the proper parts thereon. In Fig. 3 the block has been prepared for testing of the meter by association therewith of the proper testing devices and appurtenances. In order to make such necessary test, it is desirable that the testing devices be generally so to speak, of three different kinds, that is to say, there will be provided by-pass testing elements or jumpers denoted in a general way by 16 and shown in detail in Fig. 4. These by-pass elements or jumpers will as shown consist of complemental plugs connected together mechanically and electrically by a flexible wire cable, and each of which plugs is provided with a suitable insulating handle as common in the art. The purpose of the by-pass is to jump or by-pass around the meter from the service to the load side. The main testing circuit plug or connecting terminals are shown in Fig. 5 and denoted in a general way by 17 and consist of a blade-like terminal member at the end of a flexible cable and also provided with an insulating handle also as common in the art. The potential testing plug as shown in Fig. 7 and denoted in a general way by 18 consists of a plug terminal at the end of a suitable flexible cable and also provided with a suitable insulating handle as common in the art. The number of each of these different testing appurtenances required will depend upon the conditions and character of the service, style of meter and other conditions of each particular installation, but in the case for instance, of a three-wire installation using an appliance as herein shown and illustrated, there will ordinarily be required two by-pass or jumpers like 16, two main testing plugs and cables as 17 and two potential plugs and cables as 18.

A manner of making the test and using the different testing appliances is clearly illustrated in Fig. 3 which shows as has already been stated the block prepared for testing in conjunction with the coöperating testing plugs and cables. It will be understood that the first step in making a test has been to by-pass around the meter. This is done by taking each of the by-pass or jumper testing elements like 16 and connecting across from the service to the load side on each of the two outside wires or legs of the circuit. As shown one end of each jumper or by-pass like 16 is connected to the meter end contact at the rupturing end of the service side connector, while the other end of the same jumper or by-pass 16 is connected to the load connected contact of the complemental or load side connector. Consequently the service current passing through the fused connector by-passes through the jumper or by-pass 16 to the load side and around the meter. Due to the fact that the load side connected end of the jumper is connected to the load connected contact of the load side connector, the latter connector may be manipulated to open the meter loop without affecting the current passing through the by-pass or jumper to the customers' load. This it will be understood applies to both sides of the circuit. After the current has been by-passed in the manner described, then the load side (as shown the unfused) connectors may be opened and such opening, it will be understood, has in no way interfered with the service of current to the customer. In order now that the meter may properly be tested, it is simply necessary to connect each one of the two main testing circuit plugs like 17 with the contacts that have been freed by the opening up of the load side connectors. After the meter has thus been connected in the testing circuit, the potential connections may be made by inserting the plugs like 18 connected with the potential testing instruments into the sockets 9 associated with the opened up load side connectors 5. It will be clear that current for the test is provided in a manner as has already been made clear in my earlier applications. For the particular test here shown current is supplied through the two fused connectors on the service side of each of the two outside wires of the circuit to each of which one terminal of each of the two coils of the three-wire meter will be connected.

It will be understood from what has already been said that it is not imperative or essential that the testing plugs 18 be inserted in the sockets 9 of the connectors 5, because as will readily be apparent, exactly the same electrical connections can be made if the potential plugs 18 are inserted in the sockets 9 associated with the service side fuse carrying connectors 6. Again it will be apparent that if desired the main testing cable plugs like 17 may, instead of being provided with blade-like terminals for coaction with the freed contacts at the rupturing ends of the load side connectors 5, be provided with plug pins similar to those of the other testing appurtenances and that there may be provided sockets or similar means like 14 into which such main testing plug may be inserted. These sockets like 14 when so provided will be located at the rupturing ends of the load end connectors and electrically connected with the rupturing end contact. In other words this last described arrangement would be the same as that already described in connection with such similar parts in connection with other contacts. It will now be understood that in making tests with the appliance herein shown and described, it is not necessary to connect with the sockets associated with the connectors in order to by-pass the current from a service side to a load side connector, but such connector associated sockets may be used for this purpose if desired, because as will readily be appreciated, one end of the by-pass may be plugged into the socket 9 at the meter end of the service side connector 6 instead of being plugged into the socket 14 at the contact on this end of the connector. By providing, however, this additional means of making testing connections and particularly by-passing, I have provided the tester with a greater range of testing possibilities. Certainly it will be clear when for instance the two load side connectors like 5 function and operate as switching members in the outside legs of the three wire circuit, then the sockets 9 on the two outside fused connectors 6 may be dispensed with, because then these connectors 6 would not serve as circuit controlling switching members and the proper by-passing testing connection can be made by connection with the sockets 14 previously referred to.

It will be obvious from the foregoing description that my appliance comprises a switching element and a cut out element and coöperating contacts. One of the connectors as 5 may constitute such a switching element and the next adjacent connector 6 may constitute such a cut out element. In Fig. 1 I have illustrated for example, that the two outside fused connectors 6 are coupled to the switching operating member 10, so that these fused connectors function as switching elements. I have further alluded to the fact that the several connectors may be coupled in various ways to the switch operating member 10. For example and for simplicity of understanding take the two connectors 5 and 6 on the right in said Fig. 1. The connector 5 can be coupled to the switch operating member 10 through the intervention of the block 12 and the screw 13 supported thereby, and when it is so connected said connector 5 then becomes a switch operating element pure and simple. When, therefore, the element 5 is connected or coupled to the switch operating member for movement therewith to control the circuit, the adjacent connector 6 is uncoupled from the switch operating member 10 and then becomes one convenient type of cut out element. It will be clear that one contact of each of the elements 5 and 6 on the right in Fig. 1 can be connected with a meter coil, and I can advantageously for this purpose connect what are shown as the upper contacts in the view under consideration. One of the contacts of the cut out element and one of the contacts of the switching element, as I have already described, has provision for the connection therewith of a by-pass element to by-pass the current around the meter coil.

What I claim is:

1. A meter-testing appliance comprising a plurality of pairs of contacts, and their coöperating connectors, one of which constitutes a load-controlling switching element, at least one contact of each pair having means electrically connected therewith for the connection thereto of testing means to thus adapt the appliance for meter-testing.

2. A pair of contacts and a load-controlling switching connector coöperative therewith to open and close connections therebetween, one of the contacts having means electrically connected therewith for the connection thereto of testing means.

3. A pair of contacts and a connector coöperative therewith to open and close connection therebetween, one of the contacts having means electrically connected therewith for the connection thereto of testing means, and the connector also having means for the connection therewith of testing means when in either its open or closed position.

4. A pair of contacts and a connector coöperative with the contacts to open and close connection therebetween, one of the contacts having means electrically connected therewith for the connection thereto of testing means and the connector having means for the connection therewith of the same testing means.

5. A meter-testing appliance comprising a pair of contacts and a connector coöperative with the contacts to open and close connection therebetween, said contacts being each provided with wire connecting means and one of the wire connecting means having means in electrical connection therewith for the connection thereto of testing means, said appliance being provided with means to permit it to serve for load switching or meter-testing.

6. A meter-testing appliance comprising a pair of contacts and a connector coöperative therewith to open and close connection therebetween, one of the contacts having a a testing device receiving socket part connected therewith, said appliance being provided with means to permit it to serve for load switching or meter-testing.

7. A pair of contacts and a connector coöperative therewith to open and close connection therebetween, one of the contacts having a socket electrically connected therewith to receive a testing device, and the connector having a socket to also receive a testing device.

8. A pair of contacts and a connector coöperative therewith to open and close connection therebetween, one of the contacts having a socket electrically connected therewith to receive a testing device, and the connector having a socket to also receive a testing device, both the sockets being sized to receive the same testing device.

9. A pair of contacts and a connector coöperative therewith to open and close connection therebetween, one of the contacts having a socket electrically connected therewith to receive a testing device and the connector having a socket to receive the same testing device or a switch operating element.

10. A plurality of pairs of contacts, a service side connector coöperative with one pair of contacts to open and close connection therebetween, and a load side connector coöperative with another pair of contacts to open and close connection therebetween, the meter coil end contact of the first mentioned pair and the load end contact of the second mentioned pair having means for the connection therewith of a testing device.

11. A plurality of pairs of contacts, a service side connector coöperative with one pair of contacts to open and close connection therebetween, and a load side connector coöperative with the other pair of contacts to open and close connection therebetween, the meter coil end contact of the first mentioned pair and the load end contact of the second mentioned pair having means for the connection therewith of a testing device, one of the connectors having means for the connection therewith of a testing device.

12. A meter-testing appliance comprising a plurality of pairs of contacts and connectors coöperative with the respective pairs of contacts to open and close connection therebetween, at least one contact of each pair having means electrically connected therewith for the connection thereto of testing means, one of the connectors when in the opening position freeing one of its contacts for the connection therewith of testing means, said appliance being provided with means to permit it to serve for load switching or meter-testing.

13. A plurality of pairs of contacts and connectors coöperative with the respective pairs of contacts to open and close connection therebetween, at least one contact of each pair having means electrically connected therewith for the connection thereto of testing means, one of the connectors when in the open position freeing one of its contacts for the connection therewith of testing means, and one of the connectors having means for the connection therewith of either switch operating or testing means.

14. A meter-testing appliance comprising a plurality of pairs of contacts and connectors coöperative with the respective pairs of contacts to open and close connection therebetween, at least one contact of each pair having means electrically connected therewith for the connection thereto of a by-passing device, said appliance being provided with means to permit it to serve for load switching or meter-testing.

15. A meter-testing appliance comprising a plurality of pairs of contacts and connectors coöperative with the respective pairs of contacts to open and close connection therebetween, at least one contact of each pair having means electrically connected therewith for the connection thereto of a by-passing device, one of the connectors being fused, said appliance being provided with means to permit it to serve for load switching or meter-testing.

16. A meter-testing appliance comprising a plurality of pairs of contacts, a service side connector coöperative with one pair of contacts to open and close connection therebetween, a load side connector coöperative with the other pair of contacts to open and close connection therebetween, at least one contact of each of said aforesaid pairs of contacts having means for the connection therewith of a by-pass device for by-passing current from one of said pairs of contacts to the other of said pairs of contacts, said appliance being provided with means to permit it to serve for load switching or meter-testing.

17. A meter-testing appliance comprising a pair of contacts and a connector coöperative therewith to open and close connection therebetween, one of the contacts having wire connecting means, and also having a testing device receiving socket electrically connected therewith, said appliance being provided with means to permit it to serve for load switching or meter-testing.

18. A meter-testing appliance comprising a pair of contacts, a connector coöperative with said contacts to open and close connection therebetween, wire connecting means associated with said contacts, at least one of said wire connecting means having associated therewith, means for connection thereto of a testing device, said appliance being provided with means to permit it to serve for load switching or meter-testing.

19. A meter-testing appliance comprising a pair of clip contacts, a blade connector pivoted between the lips of one of the contacts and movable into and out of contact engagement with the other clip contact, said clip contacts having wire connecting means electrically associated therewith, and one of said wire connecting means having a testing instrument receiving means electrically associated therewith, said appliance being provided with means to permit it to serve for load switching or meter-testing.

20. A pair of contacts, a connector coöperative therewith to open and close connection therebetween, one of the contacts having means for the connection therewith of testing means, and the connector having means for the connection therewith of testing means, said connector when in the open position freeing one of its contacts for the connection therewith of testing means.

21. A meter-testing appliance comprising a plurality of pairs of contacts, a connector coöperative with each pair of contacts to open and close connection therebetween, at least one contact of each pair having means for the connection therewith of a by-pass to electrically bridge across the pairs of contacts independently of the connectors, said appliance being provided with means to permit it to serve for load switching or meter-testing.

22. A meter-testing appliance comprising a plurality of pairs of contacts, a connector associated with each of said pairs, means associated with at least one of the contacts of two adjacent pairs for receiving a by-pass testing instrument for thus bridging across from one connector to the other independently of the connectors, said appliance being provided with means to permit it to serve for load switching or meter-testing.

23. An appliance of the character set forth comprising a load-controlling switching element and a cut out element and their coöperating contacts, one contact of each element having means for the connection therewith of a meter coil, and one contact of each element having means for the connection therewith of a by-pass element to by-pass the current around the coil.

24. A load-controlling switching element and a cut out element, and means for connecting said elements with opposite sides of a meter coil and for by-passing the current around the coil.

25. In a meter testing appliance, a load-controlling switching element and a cut out element, each having means for the connection therewith of a by-pass element to by-pass the current from one of said elements to the other.

26. In combination with service line, load line and meter connections and meter testing apparatus, switch lever for opening and closing circuit from said service line connections to said meter and load line connections, fixed contacts coöperating with said levers, fixed auxiliary contacts electrically connected to said lever contacts, and a plurality of separate jumpers, each having a pair of contacts adapted to engage said auxiliary contacts to establish circuit from said service line connections to said load line connections independently of the meter.

27. In combination with service line, load line and meter connections and meter testing apparatus, switch levers for opening and closing circuit from said service line connections to said meter and load line connections, fixed contacts coöperating with said levers, fixed auxiliary contacts electrically connected to said lever contacts, and a plurality of separate jumpers, each having a pair of contacts adapted to engage said auxiliary contacts to establish short circuits from each conductor of said service line connections to the corresponding conductor of said load line connections.

In testimony whereof I affix my signature in presence of two witnesses.

JOSEPH SACHS.

Witnesses:
L. L. MARKEL,
HEATH SUTHERLAND.